United States Patent [19]

Haensch

[11] 4,094,335

[45] June 13, 1978

[54] BEER TAP ROD RETAINER

[76] Inventor: William C. Haensch, 2163 Arapahoe St., Denver, Colo. 80205

[21] Appl. No.: 733,161

[22] Filed: Oct. 18, 1976

[51] Int. Cl. .................................................. F16k 43/00

[52] U.S. Cl. .................................................. 137/317

[58] Field of Search ............... 137/212, 317, 319, 322, 137/324, 315, 316; 222/400.7

[56] References Cited

U.S. PATENT DOCUMENTS

| | | | |
|---|---|---|---|
| 322,853 | 7/1885 | Reilly et al. | 137/322 |
| 499,537 | 6/1893 | Guenther | 137/324 |
| 1,150,420 | 8/1915 | Davis et al. | 137/322 |
| 2,790,572 | 4/1957 | Flaith et al. | 137/317 |
| 3,135,438 | 6/1964 | Wex et al. | 222/400.7 |

FOREIGN PATENT DOCUMENTS

| | | | |
|---|---|---|---|
| 277,170 | 7/1913 | Germany | 222/400.7 |
| 109,022 | 11/1939 | United Kingdom | 137/317 |

*Primary Examiner*—Alan Cohan
*Assistant Examiner*—G. L. Walton
*Attorney, Agent, or Firm*—W. Britton Moore

[57] ABSTRACT

A beer tap rod and tap retainer including a bracket with an apertured lateral extension at its upper end and a clamping ring spaced therebelow for mounting a tap therebetween so that the rod is sleevable therethrough and the clamping ring rotatably interlocked with the neck of a keg to retain the rod and tap thereon and prevent accidental ejection thereof.

8 Claims, 4 Drawing Figures

BEER TAP ROD RETAINER

This invention relates to a beer tap rod and tap retainer bracket having the tap arranged therein and sleevingly receiving the rod therethrough and including a lower clamping ring thereon for interlocking with the neck of a keg to retain the rod and tap therein and thereon and prevent accidental ejection thereof.

Heretofore, it has been customary to slidably insert and force a hollow tap rod through the tapping hole of a beer keg by the application of force on the end thereof so that the tap is dislodged and pushed into the keg. Thereafter, the rod is secured to the keg by various types of nuts and packing glands. Inasmuch as keg beer is received from the brewery under great pressure, the tapping of a keg requires dexterous and quick tightening of the tap rod connections, which operation is hazardous and often results in sudden forceful ejection of the rod with injury to the operator. In addition, these connections are often insecure and thereafter result in sudden and unexpected ejection of the tap rod. While attempts have been made to overcome these hazards, such as represented by U.S. Pats. to Stelma Nos. 2,830,611 — 4/15/58 and Perlick 3,077,202 — 2/12/63, these devices have not proved successful, in that they are cumbersome and rather complicated, and cannot be easily assembled, and, consequently, have not been adopted.

The principal object of the present invention is to provide a beer tap rod and tap retainer bracket with an apertured lateral extension at its upper end and a clamping ring spaced therebelow for mounting a beer tap therebetween and enabling the rod to be sleeved therethrough and the clamp ring rotatably interlocked with the neck of the keg to retain the rod and tap therein and thereon and prevent accidental ejection thereof.

Another object is the provision of a tap rod and tap retainer bracket having an apertured lateral extension with a pair of legs pivoted thereto and depending therefrom and having a clamping ring extending between and pivoted to the lower ends of the legs so as to be spaced below the extension.

Still another object is the provision of a tap rod and tap retainer bracket wherein the lateral extension is flat and flared upwardly at its opposing ends so as to be adapted to overhang and engage the tap.

A further object is to provide a tap rod and tap retainer bracket wherein the clamping ring is adapted to interfit and interengage with the neck of the keg to retain the tap rod and tap thereon.

A still further object is the provision of a tap rod and tap retainer bracket of simple, light and inexpensive construction.

These and various other objects and advantages will be apparent as the specification is considered with the accompanying drawings, wherein FIG. 1 is a perspective view of a tap rod and tap retainer bracket in assembled position on a beer keg;

Figure 4:
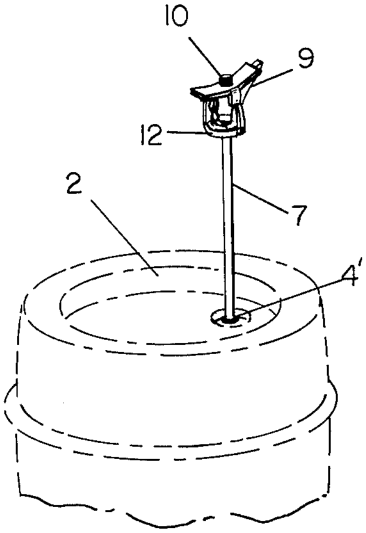
FIG. 4 is a perspective view of a tap rod and tap retainer bracket being inserted through the tap opening of a beer keg.
Figure 1:
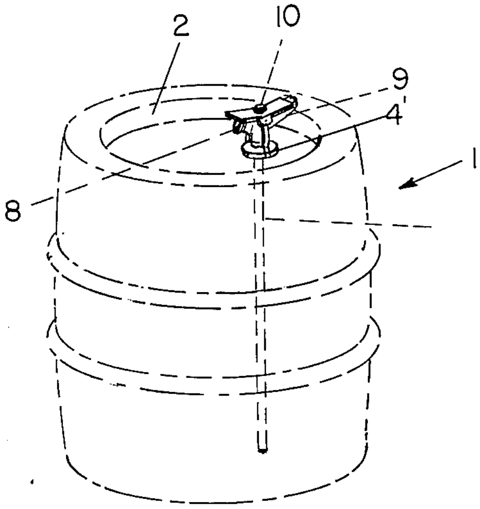
Figure 2:
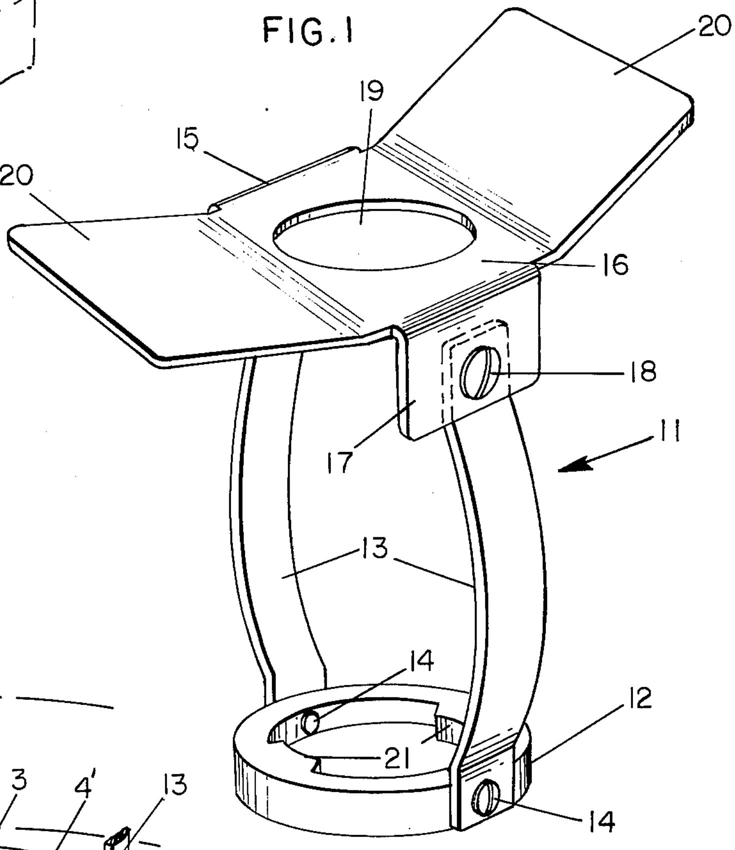
FIG. 2 is a perspective view of the tap rod and tap retainer bracket.
Figure 3:
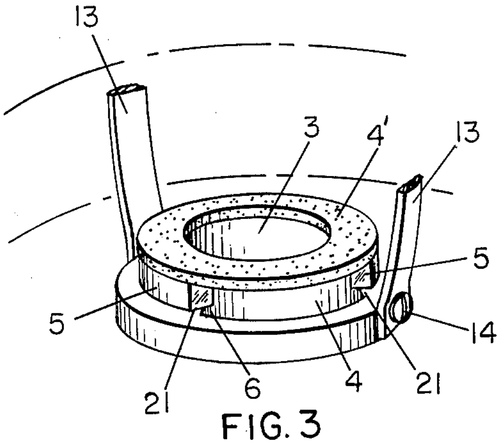
FIG. 3 is a perspective view, partly broken away, of the tap retainer bracket arranged on the tapping neck of a beer keg.

Referring more particularly to the drawings, wherein similar reference characters designate like parts throughout the several views, numeral 1 generally refers to a conventional tubular metal beer keg having a corked tapping hole 3 in the upper end 2 thereof with an upstanding neck 4 therearound. A pair of spaced arcuate lobes 5 suitably formed on the annulus of neck 4 project oppositely and laterally therefrom and are spaced above the upper end wall of the keg, as at 6, to accommodate arcuate locking flanges 21 on a tap retainer bracket 11, thereinafter to be described. A suitable sealing gasket 4' is usually disposed on neck 4.

A uniform diameter tap rod 7 having a conventional tubular beer tap 8 suitably affixed to the upper end thereof is adapted to be inserted through tapping hole 3. The beer tap 8 is provided with a tubular branch 9 projecting at an angle from one side to which a hose, not shown, is connected thereto and by which $CO_2$ gas may be fed to the keg to maintain a predetermined pressure on the beer therein, and to also carbonate the beer, as is well known. The outer or upper end 10 of the tap rod carries the customary faucet, also not shown, by which the rod may be connected to the beer dispensing facilities.

The tap rod 7 is manually inserted and pushed downwardly through tapping hole 3 so that it is subjected to gas pressure from within the keg. While, heretofore, it has been the practice to threadedly or otherwise secure the tap rod therewithin, great care has to be exercised to securely attach the rod and the latter frequently is forcefully ejected therefrom. Accordingly, a tap retainer bracker 11 is provided with a lowermost clamping ring 12 to which the lower ends of a pair of oppositely disposed, upwardly extending, outwardly bulged, flat arms 13 are pivotally connected, as at 14, to the annulus of the ring. A flat generally rectangular plate 15 having downturned ears 17 on opposite sides of a flat midsection 16 thereof is pivotally connected, as at 18, to the upper ends of arms 13. The flat midsection 17 is apertured, as at 19, and the end portions thereof are bent or angled slightly upwardly, as at 20, so that the plate has a general concave configuration.

Before inserting the tap rod 7 and beer tap 8 thereon within the keg, the upper plate 15 and arms 13 are swung to one side so that the aperture 19 is misaligned with clamping ring 12, and the tap rod is inserted through the ring. Thereafter, plate 15 and the arms 13 are returned to upright positions where opening 19 is aligned above and overhangs the upper end 10 of the tap rod and the latter is moved slightly upwardly so that this end of the rod projects through plate opening 19. Thus, the bulged arms 13 will snugly embrace the tubular beer tap 8 and the latter will be contained or housed between upper plate 15 and the lowermost clamping ring 12. When assembling the tap rod in a keg, the operators hand will grasp the bracket with the palm snugly engaging the flat upturned plate 15 so that downward pressure thereagainst will force the tap rod through the tapping hole.

A pair of oppositely disposed arcuate flanges 21 are formed on and project inwardly of the ring so that, when the tap rod is inserted through tapping hole 3, the ring will overly the neck 4 therearound. When rotated, flanges 21 will be misaligned with the arcuate lobes 5 on neck 4 which permits the ring being moved thereover so that the lobes will be disposed above the top of the ring. Thus, upon rotation of the bracket, flanges 21 on ring 12 will be positioned below and aligned with lobes 5 so as to be engaged thereby and locked in position on the tapping hole neck, in an obvious manner. It should, therefore, be obvious that the tap rod and beer tap will be securely clamped on the keg and will be prevented from being accidentally dislodged therefrom. When it is desired to remove the tap rod from an empty keg, it will only be necessary to rotate ring 12 in an opposing direction to clear lobes 5 so that the retaining bracket and tap rod may be withdrawn therefrom.

While a preferred embodiment of a beer tap rod retaining bracket has been shown and described, it is to be understood that various changes and improvements may be made therein without departing from the scope and spirit of the appended claims.

What is claimed:

1. A beer tap rod and tap retainer bracket for mounting on a hollow tap rod having a tubular tap affixed to the upper end thereof and wherein said tap rod is insertable through a corked tapping hole therein, said bracket including a lower clamping ring for receiving the tap rod, said ring being clamped to said keg tapping hole, substantially flat and centrally apertured plate means spaced above said clamping ring for receiving said tap rod, and spaced arm means pivoted to and interconnecting said ring and plate means for relative pivotal movement therebetween whereby said tap is arranged therebetween and said tap extends through both said ring and plate means and is secured to the keg and prevented from being dislodged therefrom, and said arms and plate means are pivotal to permit of the installation of said tap through the clamping ring thereof.

2. A beer tap rod and tap retainer bracket as defined by claim 1, wherein said tapping hole has a neck therearound, and said clamping ring has flange means thereon engageable with and for locking said ring and bracket thereto.

3. A beer tap rod and tap retainer bracket as defined by claim 2, wherein said neck has lobe means thereon, and said flange means is interconnected therewith.

4. A beer tap rod and tap retainer bracket as defined by claim 3, wherein the ends of said plate means are angled upwardly.

5. A beer tap rod and tap retainer bracket as defined by claim 4, wherein said plate means has downturned ears thereon, and the upper ends of said arm means are pivotally connected to said ears, and the lower ends of said arm means are pivotally connected to said clamping ring.

6. A beer tap rod and tap retainer bracket as defined by claim 3, wherein said flange means on said clamping ring interfit below said lobe means for clamping said bracket to said tapping hole.

7. A beer tap rod and tap retainer bracket as defined by claim 1, wherein said plate means is disposed above and overhangs said tubular tap.

8. A beer tap rod and tap retainer bracket as defined by claim 1, wherein said arm means are flat and outwardly bulged to snugly embrace said tubular tap.

* * * * *